United States Patent [19]

Widhopf

[11] Patent Number: 4,945,823
[45] Date of Patent: Aug. 7, 1990

[54] WHIRLPOOL

[75] Inventor: Martin Widhopf, Freising, Fed. Rep. of Germany

[73] Assignee: Anton Steinecker Maschinenfabrik GmbH, Fed. Rep. of Germany

[21] Appl. No.: 345,980

[22] Filed: May 1, 1989

[51] Int. Cl.$^5$ ................................................ C12B 1/02
[52] U.S. Cl. ................................ 99/276; 134/167 R; 239/558
[58] Field of Search ............ 99/275, 276, 277, 277.1, 99/277.2, 278, 323.1, 323.2; 134/167 R, 168 R; 239/558

[56] References Cited

U.S. PATENT DOCUMENTS

| | | | |
|---|---|---|---|
| 3,113,046 | 12/1963 | Reddick | 134/168 R |
| 3,472,451 | 10/1969 | Orem | 134/167 R |
| 3,729,321 | 4/1973 | Vacano | 99/276 |
| 3,871,272 | 3/1975 | Melandri | 99/276 |

*Primary Examiner*—Robert W. Jenkins
*Attorney, Agent, or Firm*—Seed and Berry

[57] ABSTRACT

A whirlpool for discharging hot dregs from the wort in a beer brewing process. The whirlpool includes a circular receptacle having a diameter which is approximately 2.0 to 3.5 times as large as its liquid level and a base onto the central area of which nozzles are directed for leading the dregs deposited in the area off to the outer marginal area of the base. The whirlpool includes at least two nozzles (12: 36, 37) that are arranged above the base (3;25) such that they are adapted to be rotated about the central longitudinal axis (2; 23) of the receptacle. The plane including the central longitudinal axis (21) of the nozzle may extend at an oblique angle to a perpendicular to the base. In one embodiment, a steam supply tube (1) is secured to the base of the receptacle, the tube being coaxial with the central longitudinal axis of the receptacle. An annular passage (9) is formed on the outer side of the tube, the annular passage communicating with a source of fluid and the nozzles. In another embodiment, a stationary liquid supply tube (24) and a guide mandrel (29) are secured to the base of the receptacle, both being coaxial with the central longitudinal axis of the receptacle. A rotatable tube portion (26) provided with nozzles is mounted coaxially on the liquid supply tube. The liquid supply tube is closed by means of a cap (28) and the mandrel extends through and engages the cap. The nozzles may be secured in position at different height levels of the rotatable tube portion.

15 Claims, 2 Drawing Sheets

WHIRLPOOL

DESCRIPTION

The present invention refers to a whirlpool for discharging hot dregs from the wort in a beer brewing process, comprising a circular receptacle the diameter of which is approximately 2.0 to 3.5 times as large as its liquid level and which is provided with a base onto the central area of which nozzles are directed for leading the dregs deposited in said area off to the outer marginal area of said base.

In the case of a whirlpool having a receptacle with the above-mentioned dimensional ratio of diameter to height, the dregs will deposit in the shape of a cone in the central area of the receptacle base. For discharging the dregs, it has already been suggested that nozzles should be provided through which water is flushed into the central area of the base, whereby the dregs are discharged radially outwards to the marginal area of the base where a channel for receiving therein the dregs is normally provided. From said marginal area the dregs are removed in the manner known.

In accordance with this suggestion for the discharge of dregs, the nozzles are formed in the central area of the base. Furthermore, it is known to direct a flow onto the cone of dregs via nozzle openings by means of a central pipe. However, it turned out that the dregs cannot be discharged in an effective manner by means of such stationary nozzles so that socalled "dreg shadows" will frequently remain on the base of the receptacle.

The present invention is based on the task of further developing a whirlpool of the type mentioned at the beginning in such a way that the dregs can be discharged more effectively.

For the solution of this task, the invention provides the feature that at least two nozzles are arranged above the base such that they are adapted to be rotated about the central longitudinal axis of the receptacle.

Advantageous embodiments of the invention are characterized in the subclaims.

The deposited dregs can be released and led off to the marginal area of the base much more effectively by means of the rotatable nozzles, since the nozzles act continuously on an associated annular section of the cone of dregs. At least two nozzles, more expediently, however, three to six nozzles are arranged, whereby the efficiency is further improved. At least one of the nozzles is arranged at such a distance above the normally depositing cone of dregs that the cone of dregs will not impede the rotation of said nozzle. When the nozzles are arranged one on top of the other in the axial direction of their axis of rotation, it will be sufficient when the upper nozzles are arranged above the cone of dregs. The lower nozzles will then be flushed free when the nozzles are set in operation.

In accordance with an additional suggestion of the innovation, the nozzles are provided with pipe bends. The plane including the central longitudinal axis of the nozzles should extend at an oblique angle to a vertical plane including the central longitudinal axis of the receptacle. In the case of this arrangement, the nozzles will rotate automatically after the fashion of a water wheel in response to injection of water or of a dreg-water mixture, i.e. no separate drive means is required for driving the nozzles.

In accordance with the innovation, it is additionally suggested that the nozzles should be mounted pivotably so that the angle of the plane including their central longitudinal axis can be adjusted relative to the perpendicular. It is thus possible to adjust the speed at which the nozzles rotate as well as the angle of the injection water impinging on the cone of dregs.

When, in accordance with an additional suggestion of the innovation, the nozzles are arranged at different distances from the central longitudinal axis of the receptacle, the nozzles can effectively act on the whole cone of dregs when these distances are chosen in a suitable manner. Two nozzles can respectively be arranged in diametrically opposite relationship with each other, and said nozzles can each be arranged at the same distance from the central longitudinal axis of the receptacle.

When the whirlpool is a socalled whirlpool copper in the case of which a steam supply tube arranged coaxially with the central longitudinal axis and used for an internal cooker is secured to the base of the receptacle, it will be advantageous when an annular passage is formed on the outer side of this steam supply tube, said annular passage communicating with a fluid source and the nozzles. The annular passage can be delimited by an annular channel section on the radially outer side thereof, said channel section have secured thereto the nozzles. It will be expedient when said channel section is rotatably supported on an annular sliding bearing, which can consist of a plastic material, e.g. teflon.

When the annular channel section is composed of two half rings, this will facilitate the assembly of the arrangement and repair work which may become necessary.

When the whirlpool is not equipped with an internal cooker, it is suggested in accordance with an alternative embodiment of the innovation that the base of the receptacle should have secured thereto a stationary liquid supply tube, which is coaxial with the central longitudinal axis of said receptacle and which has coaxially arranged thereon a rotatable tube portion provided with the nozzles. The liquid supply tube extending through the base of the receptacle communicates with a source of liquid and with the upper tube portion so that water or a dreg-water mixture can be supplied to the nozzles through the liquid supply tube.

It will be advantageous when the rotatable tube portion rests on a slide seal arranged at the upper end section of the stationary liquid supply tube. For rotatably holding the attached tube portion, it is additionally suggested that a guide mandrel should be secured in position within the liquid supply tube such that it is coaxial with the central longitudinal axis of said supply tube, said guide mandrel extending through and engaging an upper cap which closes the rotatable tube portion at the upper end thereof. Also the cap and the guide mandrel can have provided between them a slide seal.

For additionally stabilizing the tube portion which is rotatably held on the stationary liquid supply tube, the inner wall of said tube portion can have secured thereto, preferably by means of welding, radially extending webs, which extend almost up to the mandrel and which can rest on said mandrel.

The nozzles can be secured in position on different height levels of the rotatable tube portion. At least two nozzles can be provided on each height level. It would, however, also be sufficient when an upper pair of nozzles is provided and when only one additional nozzle is employed below said pair of nozzles. The respective nozzles arranged on a higher level should expediently be positioned at a distance from the central longitudinal axis of the receptacle which is larger than the distance between said central longitudinal axis and the nozzle(s) arranged on a lower level. The whole area of the cone of dregs forming on the base can thus be effectively acted upon by the injection water discharged from the nozzles.

In the following, the innovation will be described on the basis of two embodiments shown in the drawing, in which FIG. 1 shows a longitudinal section through the area of the rotatable nozzles of a whirlpool provided with an internal cooker, i.e. of a socalled whirlpool copper;

Figure 1:
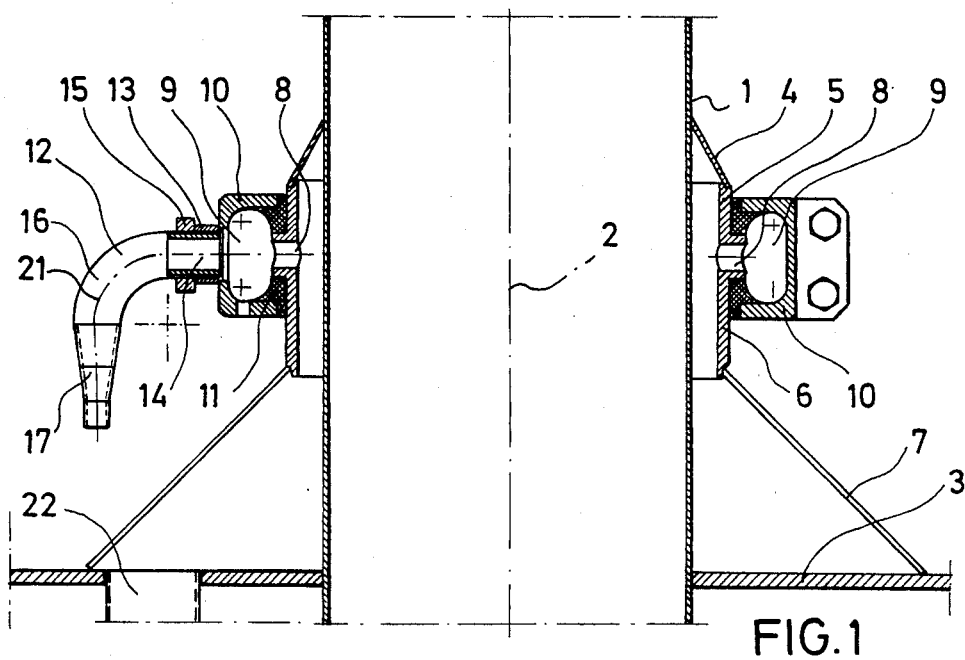
Figure 2:
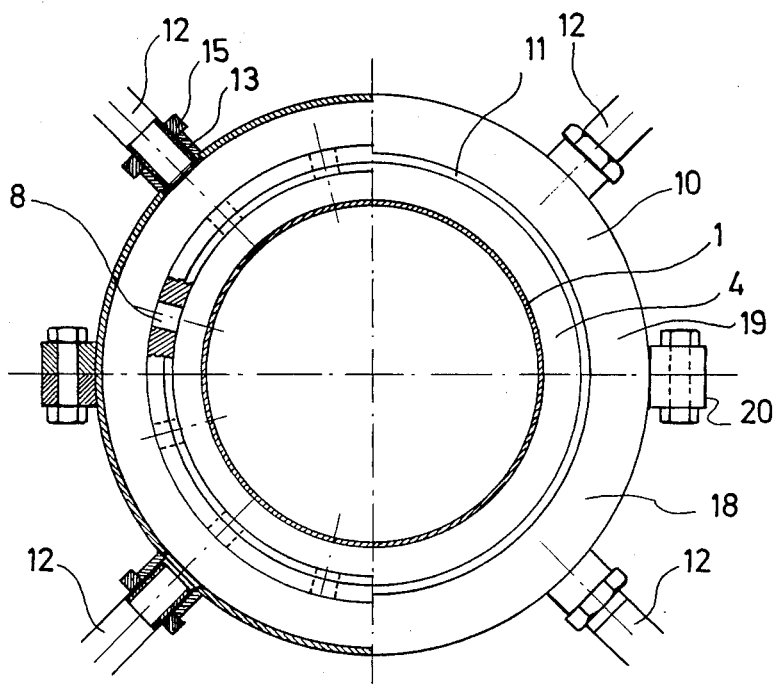
FIG. 2 shows a partially cut top view of the area according to FIG. 1.

In FIGS. 1 and 2, a steam supply tube of a whirlpool copper is outlined, said steam supply tube being arranged coaxially with the central longitudinal axis 2 of the whirlpool copper receptacle, which is not shown, and extending through the base 3 of the receptacle. An internal cooker, which is not shown either, has superheated steam supplied thereto from its base through said steam supply tube 1 so as to heat the wort in said internal cooker. On the outer side of the stationary steam supply tube 1 a circumferentially extending space is delimited, said space being shielded against the wort within the receptacle by annular sheet-metal members and sectional members 4 to 7. This space communicates with an annular space 9 via a plurality of openings 8, said annular space 9 being delimited by a channel section 10 on the radially outer side thereof.

The channel section 10 and the annular sectional members 5 and 6 have provided between them a slide seal 11 on which the channel section is rotatably held and which seals said annular space 9 towards the outside in a fluidtight manner.

Four nozzles 12 open into the channel section 10 or rather into the annular space 9 delimited thereby, said nozzles 12 being uniformly spaced from one another in the circumferential direction. The nozzles 12 are inserted in pipe sockets 13 and are supported therein such that they can be rotated about an axis 14 until a sleeve nut 15 is tightened in such a way that the nozzle 12 will be secured in the position selected.

The nozzles 12 include a pipe bend 16 and, subsequently, the actual nozzle body 17, which is directed towards the cone of dregs deposited on the base 3 of the receptacle, said cone of dregs being not shown in the figures.

The channel section is composed of two half rings 18 and 19, the combination being formed by means of two screw connections 20.

The nozzles 12 are arranged in such a way that the plane including their longitudinal axis 21 is inclined relative to the perpendicular. When liquid is supplied into the shielded space through an opening 22 in the base 3 of the receptacle and when said liquid is supplied from said shielded space into the annular space 9 and to the nozzles 12, the arrangement defined by the channel section 10 and the nozzles 12 will rotate automatically, the speed of rotation being adapted to be adjusted by the inclination of the nozzles 12.

Figure 3:
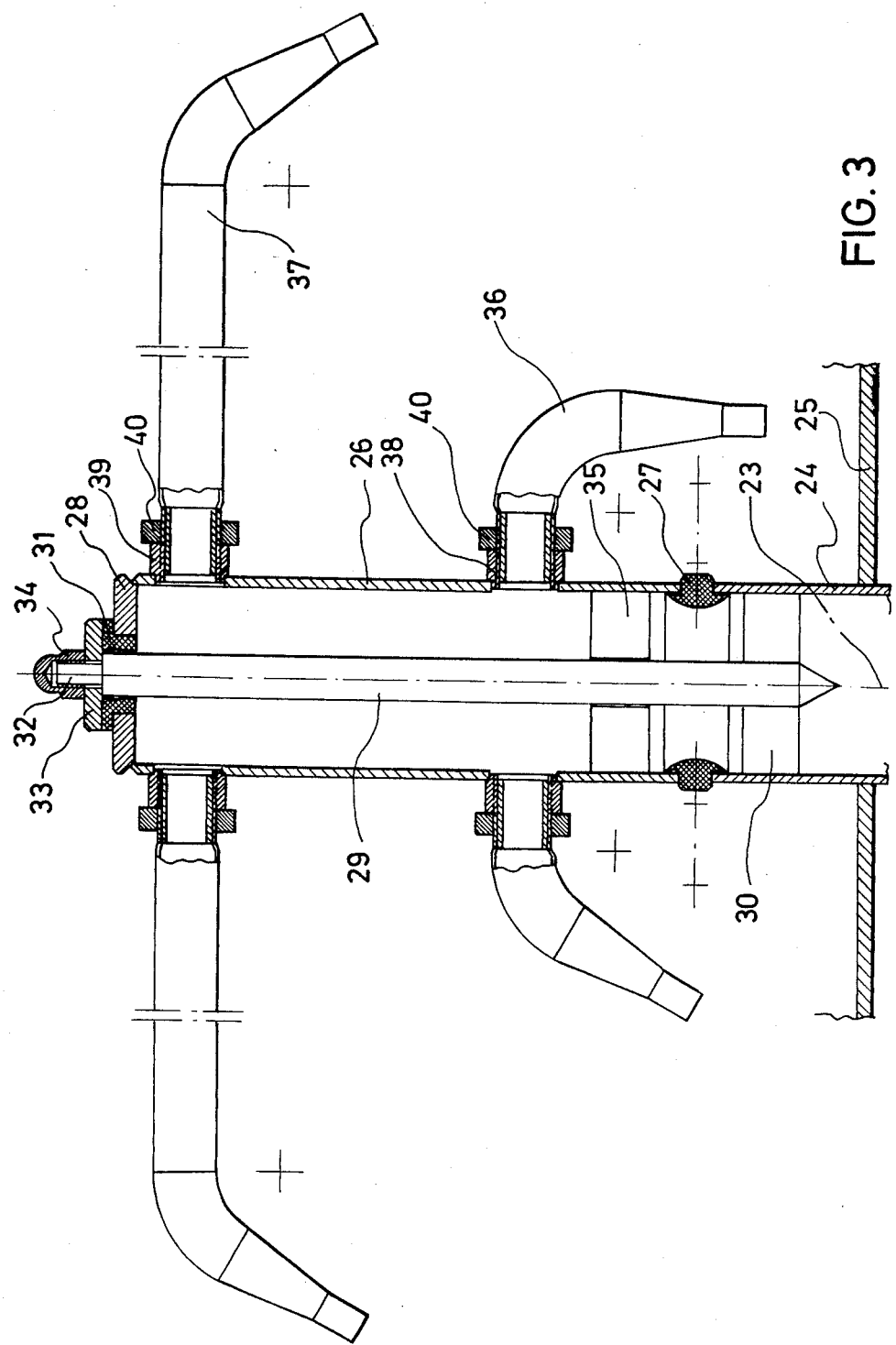
FIG. 3 shows a longitudinal section through the area of the rotatable nozzles of a whirlpool having no internal cooker.

FIG. 3 shows a detail of a whirlpool having no internal cooker. A liquid supply tube 24 is welded into the receptacle base 25 coaxially with the central longitudinal axis 23 of the whirlpool receptacle, which is not shown, said liquid supply tube 24 communicating with a source of liquid, which is not shown. A slide seal 27 is arranged between an upper rotatable tube portion 26 and the stationary liquid supply tube 24, said slide seal 27 permitting a smooth rotation of the tube portion 26 and sealing the interior of this arrangement towards the outside. The upper end of the tube portion 26 is closed by means of a cap 28.

A guide mandrel 29 is secured to the inner wall of the liquid supply tube 24 by means of radial webs 30, said radial webs 30 being welded to the liquid supply tube 24 as well as to the mandrel 29. The mandrel 29 extends through and engages a central opening of the cap 28, a slide seal 31 being provided between the mandrel 29 and the caps 28. The mandrel 29 has an upper threaded portion 32, which extends through and engages a covering disk 33 held in contact with said slide seal 31 by means of a nut 34 screwed onto said threaded portion.

For providing a further stabilizing effect, the inner wall of the tube portion 26 has welded thereto radial webs 35 extending almost up to the mandrel 29. The mandrel 29 guarantees an exact vertical position of the rotatably held tube portion 26.

Nozzles 36 and 37 are secured to the tube portion 26 on two different height levels thereof, said nozzles 36 and 37 engaging pipe sockets 38 and 39 and being adapted to be secured in the selected inclined position by means of sleeve nuts 40. The distance between the upper nozzles 37 and the central longitudinal axis 23 is larger than the distance between the lower nozzles 36 and said axis.

The water or the dreg-water mixture, which is supplied into the liquid supply tube 24 from below, flows from the interior of the rotatable tube portion 26 into the nozzles 36 and 37, which, due to their inclined position, are caused to rotate after the fashion of a water wheel together with the tube portion 26.

I claim:

1. A whirlpool for discharging hot dregs from the wort in a beer brewing process, comprising a circular receptacle the diameter of which is approximately 2.0 to 3.5 times as large as its liquid level and which is provided with a base onto the central area of which nozzles are directed for leading the dregs deposited in said area off to the outer marginal area of said base, characterized in that at least two nozzles (12; 36, 37) are arranged above the base (3; 25) such that they are adapted to be rotated about the central longitudinal axis (2; 23) of the receptacle, the respective nozzles (37) being arranged on a higher level than the nozzles (36) and being positioned at a distance from the central longitudinal axis (23) of the receptacle which is larger than the distance between said central longitudinal axis and the nozzles (36) arranged on a lower level.

2. A whirlpool according to claim 1, characterized in that the nozzles (12; 36, 37) are provided with pipe bends (16).

3. A whirlpool according to claim 1, characterized in that a plane including the central longitudinal axis (21) of the nozzle (12) extends at an oblique angle to the perpendicular.

4. A whirlpool according to claim 3, characterized in that the nozzles (12; 36, 37) are pivotably mounted so that the angle of the plane containing the central longitudinal axis can be adjusted relative to the perpendicular.

5. A whirlpool according to claim 1, characterized in that the nozzles (12; 36, 37) are respectively arranged in diametrically opposite relationship with each other.

6. A whirlpool according to claim 1, in the case of which the base of the receptacle has secured thereto a tube which is arranged coaxially with the central longitudinal axis of said receptacle and which is used for steam and condensate of an internal cooker, characterized in that an annular passage (9) is formed on the outer side of the steam supply tube (1), said annular passage communicating with a source of fluid and the nozzles (12).

7. A whirlpool according to claim 6, characterized in that the nozzles (12) are secured to an annular channel section (12) delimiting the annular passage (9) on the radially outer side thereof.

8. A whirlpool according to claim 7, characterized in that the channel section (10) is rotatably supported on an annular sliding bearing (11).

9. A whirlpool according to claim 7, characterized in that the annular channel section (10) is composed of two half rings (18, 19).

10. A whirlpool according to claim 1, characterized in that the base (25) of the receptacle has secured thereto a stationary liquid supply tube (24), which is coaxial with the central longitudinal axis (23) of said receptacle and which has coaxially arranged thereon a rotatable tube portion (26) provided with the nozzles (36, 37).

11. A whirlpool according to claim 10, characterized in that the rotatable tube portion (26) rests on a slide seal (27) arranged at the upper end section of the stationary liquid supply tube (24).

12. A whirlpool according to claim 10, characterized in that the upper end of the rotatable tube portion (26) is closed by means of a cap (28).

13. A whirlpool according to claim 10, characterized in that a guide mandrel (29) is secured in position within the liquid supply tube (24) such that it is coaxial with the central longitudinal axis (23) of said supply tube, said guide mandrel extending through and engaging the cap (28).

14. A whirlpool according to claim 13, characterized in that a slide seal (31) is provided between the cap (28) and the guide mandrel (29).

15. A whirlpool according to claim 10, characterized in that the inner wall of the rotatable tube portiom (26) has secured thereto radially extending tabs (35) which extend almost up to the mandrel (29).

* * * * *

UNITED STATES PATENT AND TRADEMARK OFFICE
CERTIFICATE OF CORRECTION

PATENT NO. : 4,945,823

DATED : August 7, 1990

INVENTOR(S) : Martin Widhopf

It is certified that error appears in the above-identified patent and that said Letters Patent is hereby corrected as shown below:

In claim 15, column 6, line 23, delete "portiom" and substitute therefor --portion--.

Signed and Sealed this

Seventh Day of January, 1992

Attest:

HARRY F. MANBECK, JR.

Attesting Officer

Commissioner of Patents and Trademarks